United States Patent
Shah

(10) Patent No.: US 7,149,476 B2
(45) Date of Patent: Dec. 12, 2006

(54) PRECISION FOR INTERFERENCE ESTIMATION IN UNSYNCHRONIZED WIRELESS NETWORKS

(75) Inventor: Dipesh Shah, Fremont, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 598 days.

(21) Appl. No.: 10/649,448

(22) Filed: Aug. 26, 2003

(65) Prior Publication Data
US 2006/0116081 A1   Jun. 1, 2006

Related U.S. Application Data

(60) Provisional application No. 60/448,121, filed on Feb. 20, 2003.

(51) Int. Cl.
   H04B 17/00   (2006.01)
   H04B 7/212   (2006.01)
(52) U.S. Cl. ............ 455/67.11; 455/522; 455/69; 370/442; 370/318
(58) Field of Classification Search ............ 455/522, 455/513, 504, 67.11, 67.13, 69, 515, 226.2, 455/226.3, 115.3; 370/318, 321, 442, 330, 370/332, 326, 337, 317; 375/347, 346
See application file for complete search history.

(56) References Cited

U.S. PATENT DOCUMENTS

| | | | | |
|---|---|---|---|---|
| 5,670,964 A | * | 9/1997 | Dent | 342/457 |
| 5,745,842 A | * | 4/1998 | Priest | 455/69 |
| 6,006,092 A | * | 12/1999 | Ward | 455/438 |
| 6,049,535 A | * | 4/2000 | Ozukturk et al. | 370/335 |
| 6,404,826 B1 | * | 6/2002 | Schmidl et al. | 375/340 |
| 6,408,172 B1 | * | 6/2002 | Alperovich et al. | 455/404.1 |
| 6,662,019 B1 | * | 12/2003 | Kamel et al. | 455/522 |
| 6,771,628 B1 | * | 8/2004 | Soderkvist et al. | 370/337 |
| 6,901,046 B1 | * | 5/2005 | Hsu et al. | 370/204 |
| 6,963,750 B1 | * | 11/2005 | Cheng et al. | 455/458 |
| 6,999,406 B1 | * | 2/2006 | Takahashi et al. | 370/208 |

FOREIGN PATENT DOCUMENTS

| WO | WO 97/31501 | 2/1997 |
|---|---|---|
| WO | WO 01/47313 A1 | 6/2001 |

* cited by examiner

Primary Examiner—Edward F. Urban
Assistant Examiner—John J. Lee
(74) Attorney, Agent, or Firm—Zagorin O'Brien Graham LLP

(57) ABSTRACT

The present invention includes systems and methods for estimating interference levels on idle channels in an unsynchronized TDMA or GSM wireless network. Each of s time slots is divided in to n distinct or overlapping segments. The interference level within each segment for each time slot is then measured and stored. In each subsequent frame in a predetermined accumulation interval T, the interference level within each segment of each time slot is measured and averaged with the measurements of the corresponding segment and corresponding time slot in previous frames. The maximum of the average interference measurements in all segments of all time slots yields increased accuracy for an interference measurement on the physical channel.

22 Claims, 5 Drawing Sheets

PRECISION FOR INTERFERENCE ESTIMATION IN UNSYNCHRONIZED WIRELESS NETWORKS

RELATED APPLICATION

The present application claims priority to U.S. Provisional Application Ser. No. 60/448,121 entitled "Precise Interference Estimation in Unsynchronized Wireless Networks" filed on Feb. 20, 2003, the entirety of which is incorporated herein.

BACKGROUND OF THE INVENTION

1. Field of the Invention

The present invention relates to measurement of interference in wireless networks, and more particularly, to systems and methods for precisely estimating interference levels wherein the interfering signals are not necessarily time-synchronized with the receiver performing the interference measurements.

2. Description of Related Art

In TDMA (Time Division Multiple Access) wireless networks such as GSM (Global System for Mobile Communications) and IS-136 based wireless networks, different mobile stations in the coverage area of a particular base station may transmit using the same physical channel, as defined by a given frequency or frequency hopping sequence. However, the signals for these mobile stations are transmitted in different time slots, thereby defining logical channels.

Mobile stations in the coverage area of different base stations may also transmit using the same physical channel, according to the principles of frequency reuse. Channel reuse allows carriers to efficiently utilize spectrum, but often presents the problem of co-channel interference. Co-channel interference occurs when the signal transmitted by a mobile station is corrupted with one or more signals transmitted by other mobile stations on the same physical channel at the same time. If the level of co-channel interference is excessive, call quality is degraded and the probability that calls will be dropped increases. Thus, measurement of interference levels, commonly calculated as the received signal strength on an idle channel, is very useful to aid in network design and interference avoidance techniques.

In particular, precise measurement of interference levels is critical to automated traffic channel selection algorithms that are commonly implemented in the wireless infrastructure. In response to a channel request emanating from a mobile station, an automated traffic channel selection algorithm controlled by the base station and/or Mobile Switching Center uses interference levels measured on different idle channels to determine the optimum channel to allocate to the wireless call, thereby increasing efficient use of radio spectrum and improving system performance.

According to one approach, interference is estimated on a particular physical channel by measuring the interference level on each of the time slots associated with the physical channel, and then, by determining the maximum of these measurements. The interference measurement on a time slot can be performed by taking a linear or logarithmic average of the energy within each bit or symbol of the time slot. This process is problematic, however, particularly in asynchronous networks. Because interfering signals are not necessarily time synchronized with the receiver performing the interference measurement, the idle time slot of the receiver performing the interference measurement may overlap the time slots of two different interferers in two separate time slots on another base station. Thus, interference measurements of the measured timeslot may include interference from one or both of the interferers. It is impossible to predict how far the interference from such an unsynchronized interferer would extend into the time slot in which the receiver is performing interference measurement (the measured time slot). Hence, the interference measurement would not necessarily reflect the peak interference experienced within the time slot. This problem may result in a significant underestimation of the interference level, particularly when the burst of the interfering mobile overlaps multiple time slots of the receiver performing interference measurement and the receiver detects no interference on the remaining parts of the measured time slot.

As an attempt to address the foregoing concern, each measured time slot can be divided into n segments. Interference measurements are made for each segment, and then the average of these interference measurements is selected as the interference for the time slot. Again, due to the potentially asynchronous nature of the transmissions, some segments of a time slot may not experience any interference, because the measured time slot could overlap multiple interferers' time slots, or include multiple bursts, or include noise and an interfering burst.

Consider the following Example 1. FIG. 2 is a simplified block diagram illustrating the relationship of the time slots of two channels, each allocated to a different base station. Frame 202 from a first base station includes four time slots, as does frame 204 from a second base station, but the time slots are not synchronized. A mobile station is transmitting via the first base station during time slot 1 of frame 202. Assume that the goal is to measure the interference caused by that transmitting mobile station, and that the measurement interval is the logical channel represented by time slot 2 of frame 204. If each time slot of frame 204 is divided into 10 segments (as shown in FIG. 3), using the starting position of time slot 1 in frame 202 as the reference point K, three segments of the measured time slot 2 have experienced no interference. To the right of reference point K, the remaining seven segments of the measured time slot 2 experience interference caused by the overlapping portion of the transmission occurring during timeslot 1 of frame 202. Another portion of the transmission overlaps a portion of time slot 3 of frame 204. When the interference for the time slot 2 of frame 204 is calculated, the calculation includes three segments with ambient noise and seven segments with interference measurements due to the signal transmission occurring during time slot 1 of frame 202. Due to the asynchronous nature of TDMA and GSM networks, the measuring receiver does not know which segments contain interference measurements. Both a linear and a logarithmic average of interference measurements across these n segments would yield lower interference estimates than the actual interference experienced at least for some of the symbols in the time slot.

In alternative embodiments in the prior art, weighting algorithms are commonly applied prior to calculating the maximum, whereby each of the n segments is afforded a weight that is proportional to the relative importance of the symbols included in that segment. For example, the initial segments of a time slot may typically include control bits, and may therefore be given lower weight than the data bits. In this scenario, weighting the segments before estimating the interference level is also problematic in asynchronous networks where the interfering burst is not necessarily time aligned, due to the potential for applying the wrong weight to a particular symbol. It cannot be predicted where the control bits (as well as data bits or any other important bits) of the interfering signal would be located within a time slot of the receiver performing interference measurement. The location of data bits and control bits within a time slot of the receiver performing interference measurement are known. However, the interfering burst may not overlap all the data bits and hence, the interference measured for all the data bits would still yield a lower interference estimate than the actual interference experienced by at least some of the data bits.

Thus, current methods for interference estimation in asynchronous networks are not accurate. The segmentation and weighting protocols described above does not yield the accurate interference measurement experienced on a physical or logical channel. The following examples further illustrate the shortcomings of current methods for interference measurement.

Example 2 refers again to FIGS. 2 and 3, where the measured time slot is time slot 2 of frame 204. Suppose the data bits are in segments 3 through 10 of the measured time slot, control bits are in segments 1 through 3 of the measured time slot, control bits are given weight of zero, an interfering burst occurs on segments 6 through 10 at −90 dBm, and segments 1 through 5 measure noise at −116 dBm. The resulting interference estimation yields:

$$\frac{[(3*(-116))+(5*(-90))]}{8} = -100 dBm$$

If this channel is allocated to a call, 62.5% of the data bits would experience interference at −90 dBm, i.e. 10 dB higher than the interference estimated by such an algorithm. Changing the weights would not result in accurate estimation of the interference.

Example 3 also refers to FIGS. 2 and 3, where the measured time slot is time slot 2 of frame 204. Suppose that a −100 dBm interfering burst is present across segments 2 through 10. The other assumptions remain the same as in Example 2. The resulting interference estimation yields:

$$\frac{[8*(-116)]}{8} = -100 dBm$$

The interference in this case would also be estimated as −100 dBm, which is the same as the interference estimated for Example 1, in which the interference was as high as −90 dBm. Therefore, conventional methods for interference estimation can yield the same interference measurement for quite different interference conditions.

As wireless service providers focus their efforts on increasing the quality of service provided to wireless customers, accurate interference measurements will be imperative for the efficient utilization of radio frequency spectrum of wireless networks. Underestimating the interference level may result in a problem area going unresolved, potentially allocating calls to frequencies with higher amounts of interference, and possibly, creating customer dissatisfaction and churn. Overestimating can cause the carrier to fail to reuse frequencies as efficiently as possible, thereby addition to network costs. Therefore, there is a need in the art for a more accurate approach for estimating interference level in non-synchronized networks.

SUMMARY OF THE INVENTION

Generally, the present invention comprises a system and method for estimating interference levels in an asynchronous network, such as, but not limited to, a GSM or TDMA wireless network. The systems and methods of the present invention increase the precision of interference estimation methodologies by determining the peak of averaged interference measurements detected in each segment of each time slot over the duration of a plurality of preferably sequential frames.

In accordance with the present invention, each time slot ($slot_1$, $slot_2$, $slot_s$, ..., $slot_s$) of each frame is divided into n segments ($segment_1$, $segment_2$, $segment_n$, ..., $segment_n$), wherein n is a variable, for example, ranging from 2 to 162. In certain embodiments of the invention, the segments are each distinct from one another, while in other embodiments, each segment overlaps one or more other segments. The segments are preferably but not necessarily equal. The interference level within each segment $segment_n$ for each time slot $slot_s$ of a first frame $f_1$ is then measured and stored. Thus, if there are s idle time slots, n times s (n*s) measurements are collected in one frame. As described herein, the term "frame" refers to one complete cycle of events, including a sequence of time slots corresponding to the various subchannels, as well as extra bits for control and calibration.

In the next frame $f_2$, the interference level within each segment $segment_n$ of each time slot $slot_s$ is measured and averaged with the previous corresponding measurements for each of the n*s measurements. In other words, the nth sample of the sth time slot from the previous frame(s) is averaged with the nth sample of the sth time slot of the current frame. In one embodiment, different weighting factors are applied to the current measurement. The weighting factors can be determined according to the respective value of the segments, or according to a desire to focus the measurement on a predetermined portion of the time slot, such as the center segments. In other embodiments, the measurements are weighted equally.

This measurement process continues over a predetermined accumulation interval T. T can consist of a specific number of frames, for example, ranging from as few as two to as many as 5000 frames. Alternatively, the accumulation interval T is a predetermined interval of time, for example, ranging from 100 milliseconds to 25 seconds. These ranges are merely illustrative of various accumulation intervals and are not intended to indicate maximum or minimum possible values.

The averaging step may be performed at the end of the measurement interval T, or after measurements for each frame have been taken. Once measurements are collected and averaged over the accumulation interval T, the maximum of the averages indicates the interference on the physical channel.

The present invention is particularly useful in idle-channel interference methodologies, such as methodologies for evaluating an available idle channel prior to selecting that channel for call initiation or hand-off. In idle-channel evaluation embodiments, if one of the time slots is assigned to an active call at the base station performing interference estimation, no interference measurements are accumulated throughout the duration of the active call.

For purposes of illustration of exemplary systems and methods of the various embodiments of the invention, an example of an interference calculation is described in general and in greater detail below.

Assume the accumulation interval T is equal to the duration of a single frame, which can be approximately 20 msec. At the end of the accumulation interval T, n signal strength measurements have been collected for each time slot s in the frame. Each measurement represents the interference level detected during a segment within the time slot. The maximum of the n measurements provides only a rough estimate of the level of interference detected within that particular time slot.

The present invention provides a more precise estimation methodology, whereby the signal strength detected during a particular segment of a time slot is averaged with the signal strength detected in the corresponding segment of the corresponding time slot of multiple subsequent frames. Then the peak interference level over the logical channel is identified as the peak of "the averaged measurements of each segment" for a particular time slot. The peak interference level over the physical channel is similarly identified as the peak of the averaged measurements for all of the time slots in the physical channel.

Estimation of the Interference Level on the Logical Channel:

In preferred embodiments, the accumulation interval T encompasses multiple frames, each frame containing s time slots and n*s segments. Thus, interference measurements are collected for a total of n*s*f segments, where f is the number of frames in accumulation interval T. The interference measurements in the nth segments of the sth time slots in each of the frames f are averaged together. At the end of the accumulation interval T, n*s average signal strength measurements have been calculated. Each average represents the signal strength of interference detected during a particular segment within a time slot. The maximum of the n averaged interference levels for each time slot yields the interference level on the logical channel associated with that time slot.

Precise Estimation of the Interference Level Detected on the Physical Channel:

The maximum of the n*s averaged measurements as calculated above provides the estimate of the level of interference on the physical channel as experienced by the base station making the interference measurements.

Advantageously, the systems and methods of the present invention provide precise measurements of co-channel interference. Increased accuracy is also realized when measuring interference produced by one or more interfering mobile devices in a discontinuous transmission mode. These and other objects, features, and/or advantages may accrue from various aspects of embodiments of the present invention, as described in more detail below.

BRIEF DESCRIPTION OF THE DRAWINGS

Preferred and alternative embodiments will now be described with reference to the attached figures wherein like reference numerals indicate similar or identical features or functions, and wherein.

DETAILED DESCRIPTION OF THE INVENTION

Generally, the present invention encompasses systems and methods for improving the accuracy of interference estimation in unsynchronized wireless networks, in which the interfering signal may not necessarily be time synchronized with the receiver performing the interference measurements. The systems and methods of the invention are primarily described with respect to idle channel interference measurement techniques, although those skilled in the art will readily appreciate applications in conjunction with various other known and yet to be developed systems and methods for interference measurement.

Figure 1:
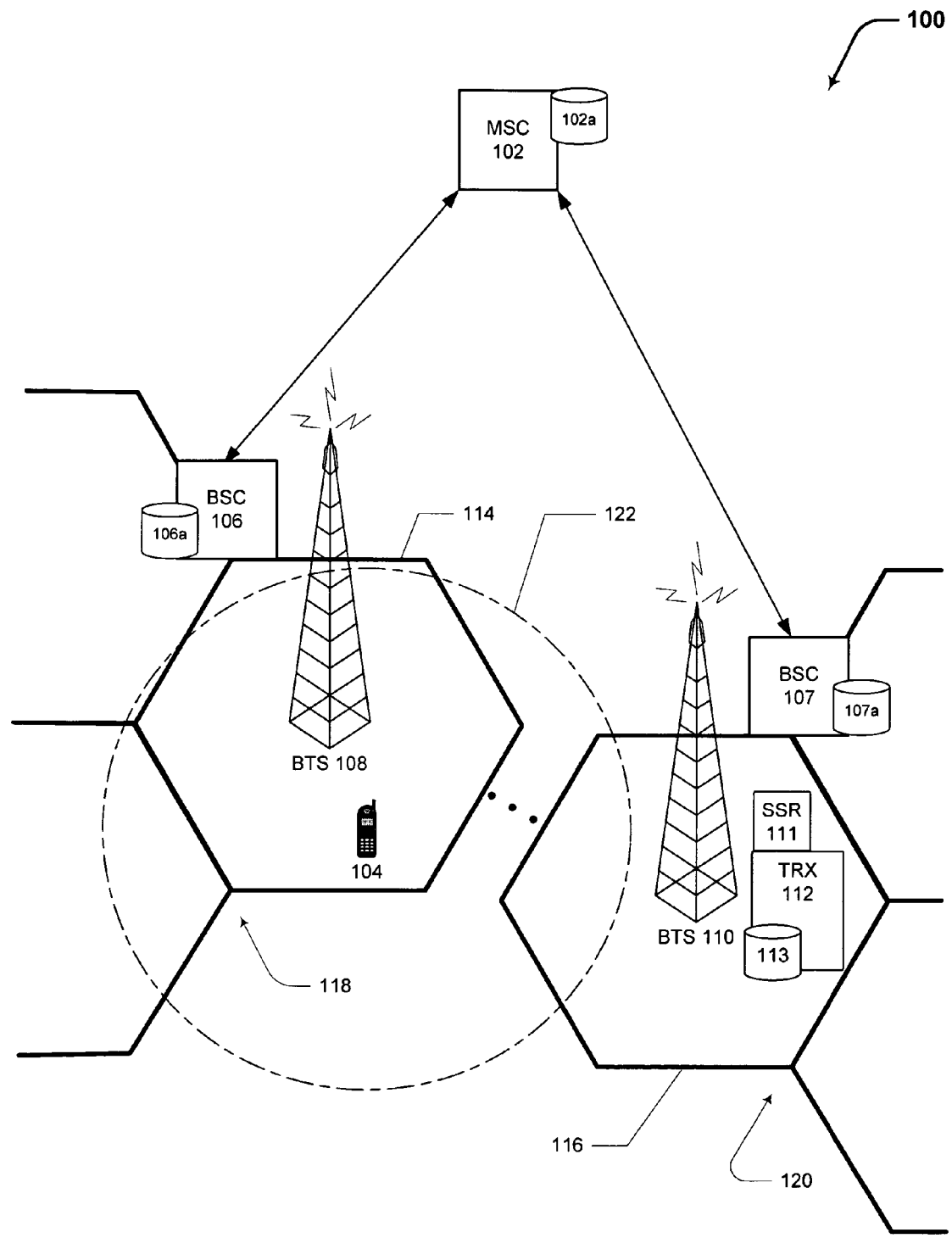
FIG. 1 is a simplified block diagram illustrating an exemplary environment for the various systems and methods of the present invention.

FIG. 1 is a simplified block diagram illustrating a GSM network 100 as an exemplary environment of the present invention, although the various systems and methods of the invention can be implemented in various types of wireless networks, including IS-136 based TDMA wireless networks. Network 100 includes a Mobile Switching Center (MSC) 102, which functions at least in part to dynamically register and allocate radio resources (RR) to each mobile station 104 in the service area of the MSC 102. In certain embodiments, MSC 102 includes a memory element, such as memory 102a. Messages and control signaling are relayed via bidirectional communications links from the MSC 102 to at least one Base Station Controller (BSC), shown as BSC 106 and BSC 107. Each BSC controls at least one Base Station (BTS), shown in the figure as BTS 108 and BTS 110. The BSC may be physically located within a BTS or may communicate with the BTS, for example, via an Abis interface. In certain embodiments, BSC 106 includes memory 106a and BSC 107 includes memory 107a.

Each BTS 108 and 110 includes various physical and logical components required to receive and transmit the messages and control signaling to and from mobile stations operating within the respective service areas of the base stations, including, but not limited to, radio equipment such as a signal strength measuring receiver (SSR) 111, antennas, and transceivers (TRXs) 112. Each TRX 112 may further comprise a transceiver memory 113.

The SSR 111 may be an integral logical component within a TRX 112 or may be an independent component of the BTS. The SSR 111 is controlled by signals received from the BSC 107 which, in turn, is controlled by signals received from the MSC 102. Thus, the SSR 111 can be directed to scan the channels available to a BTS to determine the optimal available channel to satisfy a communications request received by a mobile station. In other embodiments, the TRX is assigned a frequency and the SSR 111 continuously performs interference measurements on all the idle time slots of the TRX on the frequency assigned to the TRX.

As will be appreciated by those skilled in the art, in addition to the aforementioned elements, the network 100 includes any combination of additional or alternative physical or functional components, wired connections, wireless connections, switches, and other devices for establishing communication between communication devices.

Figure 2:
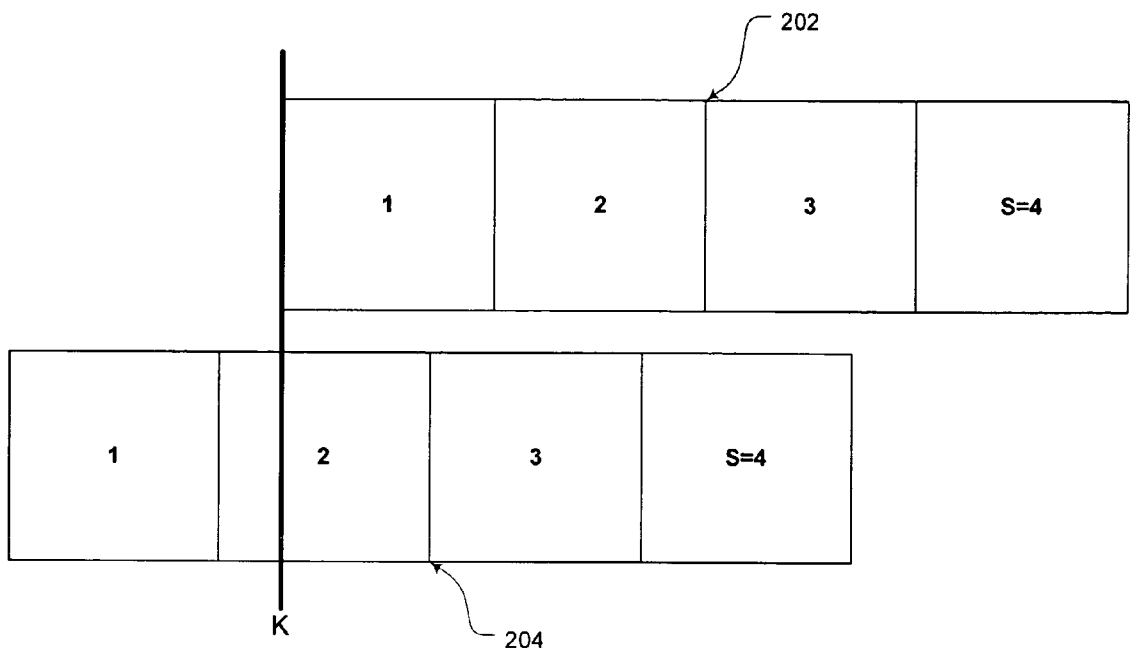
FIG. 2 is a simplified block diagram illustrating the relative positions of time slots in frames of signals emanating from different base stations in an asynchronous network, according to various embodiments of the present invention.

According to the exemplary embodiments of this invention, the network 100 is asynchronous, and thus, the frame time reference of BTS 108 is not necessarily synchronized with the frame time reference of BTS 110, as further described in FIG. 2.

Each BTS is associated with a service area commonly referred to as a cell, which is allocated a particular portion of the available frequency spectrum, which typically includes several frequency channels. According to typical frequency reuse schemes, adjacent cells and cells in the same cluster are not allocated common frequency channels. Rather, each cell in one cluster utilizes different channels in the frequency spectrum at a given point in time. The number of cells in a cluster varies according to such parameters as the cell diameter, antenna heights, reuse scheme, etc. The cells in another possibly adjacent cluster may utilize some or all of the channels in the same frequency bands as the first cluster. The broadcast power of the BTS serving each cell is typically architected to limit propagation of signals to the physical boundaries of the cell served by the BTS. Despite these measures, unwanted signals may propagate from a non-adjacent cell in another cluster. For instance, if signals are transmitted from mobile station 104 being served by BTS 108 on a specific frequency channel that is also allocated to BTS 110, the mobile station may cause co-channel interference at BTS 110.

In the exemplary environment shown in FIG. 1, mobile station 104 is within cell 114 which constitutes the service area of BTS 108, and thus, is served by (receives messages and signaling via) BTS 108. Cell 116 constitutes the service area of BTS 110. Cell 114 is a member of cluster 118, and cell 116 is a member of cluster 120. In the figure, although mobile station 104 is not served by BTS 110, signals transmitted by mobile station 104 at least intermittently propagate into an area 122 that extends beyond the service area of BTS 108 as defined by cell 114. The area 122 of stray signal propagation may also extend beyond cluster 118 so as to inject interference on an otherwise idle common channel at BTS 110. If an automatic traffic channel selection algorithm allocates that idle channel to another mobile device operating within the service area of BTS 110 as defined by cell 116, the interference may degrade call quality. Advantageously, the present invention increases the precision of the estimation of the level of the co-channel interference on the idle channel despite the asynchronous nature of the network, and thus, can improve the implementation of automatic traffic channel selection methodologies.

According to an embodiment of the present invention, SSR 111 performs interference measurements according to the various methods of the invention. The SSR 111 identifies and measures the interference on idle time slots, for example for the purpose of executing various known or yet to be developed channel selection algorithms.

Figure 3:
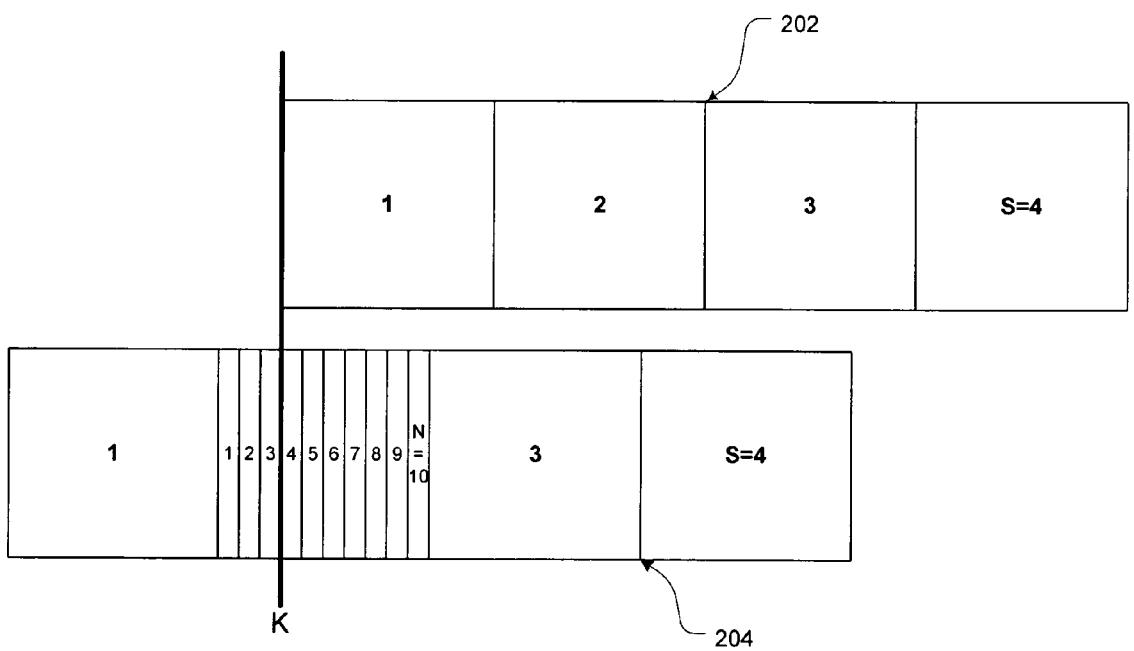
FIG. 3 is a simplified block diagram illustrating the division of a time slot into n segments, according to various embodiments of the present invention.

FIG. 2 is a simplified block diagram illustrating the relationship of the time slots of the frames of two physical channels, each allocated to a different base station in different clusters in the exemplary asynchronous network. The channels share the same portion of a frequency spectrum. Frame 202 is associated with base station 108, and frame 204 is associated with base station 110. Frame 202—time slot 1 begins at absolute time reference K. For frame 204, reference time K falls within time slot 2 and is not aligned with the beginning of that time slot. Assume that in the embodiment shown, that mobile station 104 is transmitting during time slot 1 of frame 202, and that the transmission interferes in idle time slots 2 and 3 of frame 204. Assume further, as shown in FIG. 3, that timeslot 2 of frame 204 is divided into n=10 segments, and that the time slot of interest is time slot 2 of frame 204. In this example, the logical channel defined by time slot 2 of frame 204 experiences interference in segments 4 through 10 due to the transmission occurring in time slot 1 of frame 202.

Figure 4:
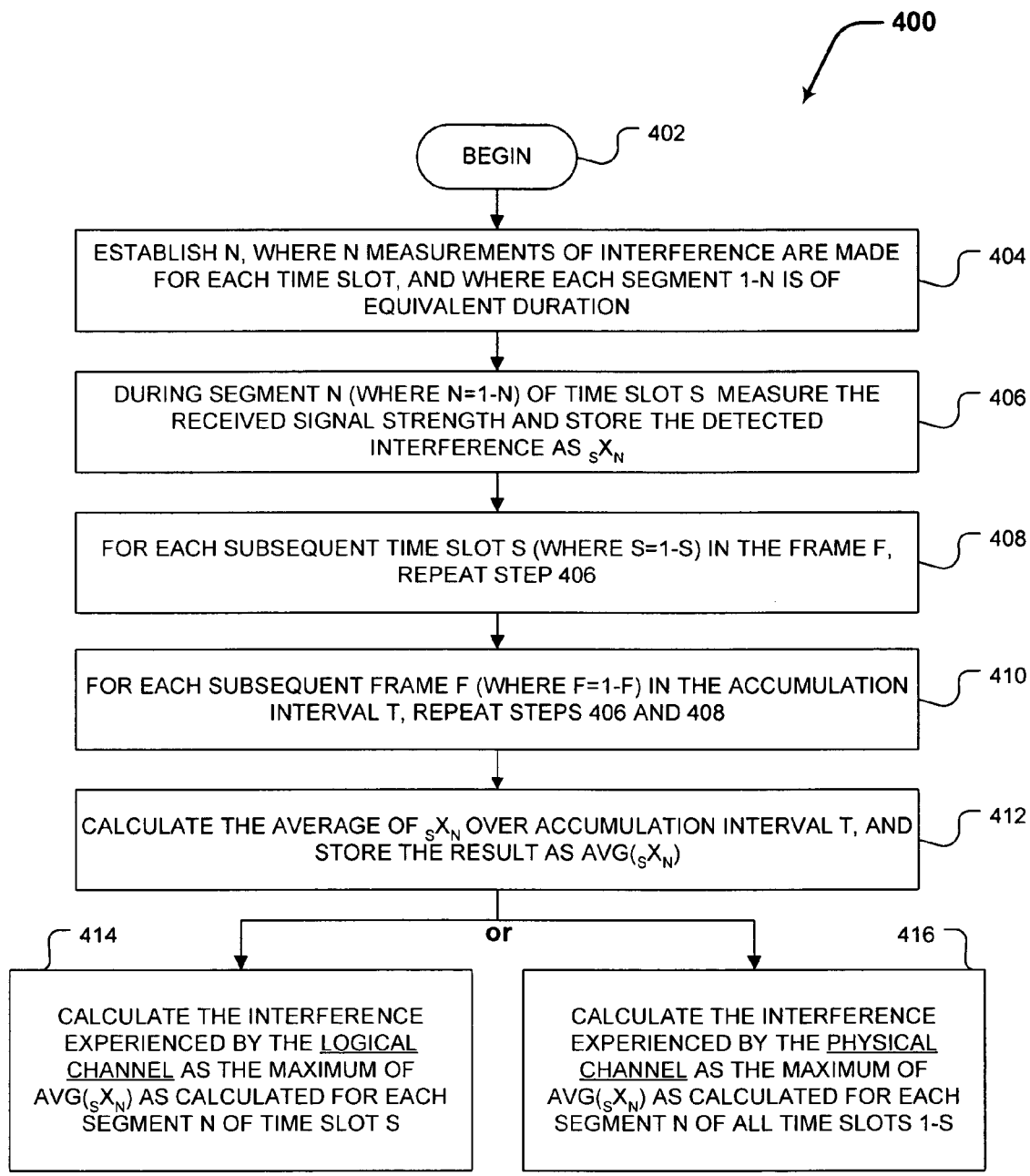
FIG. 4 is a flow diagram illustrating an exemplary method according to the exemplary embodiments of the present invention.

The flow diagram of FIG. 4 illustrates an exemplary method 400, according to the present invention, for measuring the interference experienced in a particular logical channel and/or on a particular physical channel in an unsynchronized wireless network. Any of the various embodiments of methods according to the present invention may be implemented as components of automatic channel selection methodologies.

The steps of method 400 will now be described in detail. Method 400 begins at step 402. At step 404, a segmentation value n is established, where n refers to the number of preferably but not necessarily equivalent segments in a time slot (slot$_1$, slot$_2$, slot$_s$, ..., slot$_s$). The time slot slot$_s$ may be divided into any number of segments (segment$_1$, segment$_2$, segment$_n$, ..., segment$_n$), but preferably, the number of segments is from 2 to 162. Step 404 is optional, as n may be a predetermined constant or variably programmable quantity.

Figure 5:
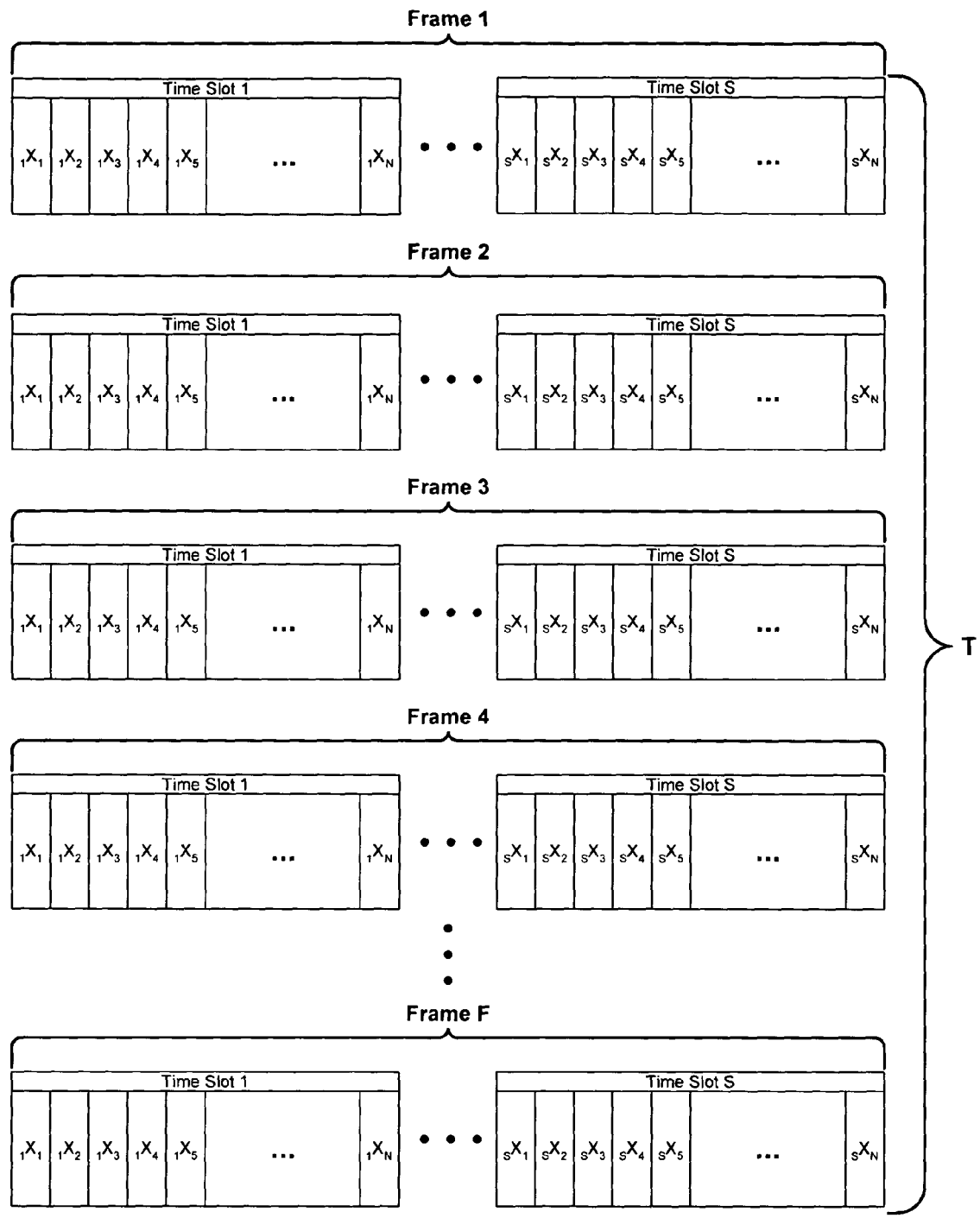
FIG. 5 is a simplified diagram illustrating an exemplary accumulation interval T as it relates to the systems and methods of the present invention.

Method 400 then proceeds to step 406, where a measurement of the received signal strength is made during each of the n segments of the time slot s. The interference level is represented by the received signal strength of the interfering transmission or transmissions. Because the time slot of interest is supposedly idle, any signal received is assumed to be interference and/or noise. The interference level is then stored as $_sX_n$ in any memory element that is accessible to network, including for example but not limited to, memory 106a at the BSC 106, memory 102a at MSC 102, in the memory 113 associated with the TRX 112 in the BTS 110 that is performing the interference measurements, or in a database associated with the BTS 110. For example, referring to FIG. 5, which is a conceptual diagram of an exemplary architecture of a memory containing interference measurements according to the present invention, in step 406, the received signal strength in segment 1 of time slot 1 is measured and stored as $_1X_1$. The received signal strength in segment 2 of time slot 1 is measured and stored as $_1X_2$, and so forth, through $_1X_N$.

The embodiments described by method 400 facilitate measurement of all logical channels individually and the physical channel in its entirety, although the method can be adapted to alternatively measure the interference on one or more selected logical channels. Therefore, referring again to FIG. 4, the exemplary method 400 proceeds to step 408. The elements of step 406 are repeated for each segment of the remaining time slots of the first frame in the accumulation interval T. Referring again to FIG. 5, these measurements yield stored values for $_2X_1$ through $_sX_N$. At this point in method 400, interference measurements have been taken for one of the f frames that are encompassed within accumulation interval T.

Next, at step 410, the elements of steps 406 and 408 are repeated for each of the remaining f frames (2 though F) in accumulation interval T. These measurements yield additional stored values for $_1X_1$ through $_sX_n$. The stored values of $_1X_1$ through $_sX_N$ for the first frame are not necessarily overwritten with any subsequent values of $_1X_1$ through $_sX_N$ collected for subsequent frames. Rather, the values may be stored by frame and then averaged, or dynamically averaged as described with respect to step 412. Alternatively, the stored values of $_1X_1$ through $_SX_N$ may be stored in a first-in/first-out (FIFO) storage element to facilitate calculation of a rolling average of the last Y frames.

At step 412, the average of the measured values of $_sX_n$ over the accumulation interval T is calculated and stored as $AVG(_sX_n)$. It should be understood that only the measurements having corresponding values for s and n are averaged together. For instance, referring again to FIG. 5, the measured value of $_1X_5$ for frame 1 [Frame 1 ($_1X_5$)] is averaged with the measured values of $_1X_5$ for frames 2 through F ([Frame 2 ($_1X_5$)] through [Frame n($_1X_5$)]), thereby yielding $AVG(_1X_5)$, as shown by the following formula.

$$AVG(_sX_n) = \frac{\sum_{f=1}^{F}[Framef(_sX_n)]}{F}$$

where f equals 1 through F (f=1 . . . F), and s and n are constant, and which can be expanded to:

$$AVG(_sX_n) = \frac{\sum[Frame1(_sX_n), Frame2(_sX_n), Frame3(_sX_n), \ldots, FrameF-1(_sX_n), FrameF(_sX_n)]}{F}$$

$AVG(_sX_n)$ is the average interference detected during segment n of time slot s during accumulation interval T, which includes f frames. As mentioned above, this averaging can occur at the end of the accumulation interval T, or dynamically, as each measurement of $_1X_5$ is taken. To dynamically calculate $AVG(_sX_n)$, an appropriate weighting factor is applied with each new measurement of $_sX_n$.

Referring again to FIG. 4, to calculate a precise estimate of the interference on the logical channel defined by time slot s, the method 400 continues to step 414. At step 414, the interference level $I_s$ on the logical channel is estimated as the maximum value of the average (over accumulation interval T) interference detected during segments 1 through N of time slot s, as shown below.

$$I_s = \underset{n=1\ldots N}{\mathrm{MAX}}[AVG(_sX_n)]$$

where n equals 1 through N (n=1 . . . N), and s is constant, which can be expanded to:

$I_s$=MAX[AVG ($_sX_1$), AVG ($_sX_2$), AVG ($_sX_3$) , . . . , AVG ($_sX_{N-1}$), AVG ($_sX_N$)]

Again, s defines a logical channel, which is a particular time slot of a given frequency.

As an example, referring again to FIG. 5, the interference level I (1) on the logical channel defined as time slot 1 is estimated as the maximum value of $AVG(_1X_1)$ through $AVG(_1X_n)$.

Referring again to FIG. 4, to calculate a precise estimate of the interference on the physical channel defined by time slots 1 through S, the method continues instead to step 416. At step 416, the interference on the physical channel is estimated as the maximum value of the average (over accumulation interval T) interference detected during segments 1 through N of each of the time slots 1 through S, as represented by either or both of the following formulae.

$$I = \underset{\substack{n=1\ldots N \\ s=1\ldots S}}{\mathrm{MAX}}[AVG(_sX_n)] \text{ or } I = \underset{s=1\ldots S}{\mathrm{MAX}}[I_s]$$

where n=1 . . N and s=1 . . S.

After the accumulation interval, another accumulation interval T may commence and the method 400 is repeated to provide additional interference measurements, and so on.

Various systems for implementing the methods of the present invention are contemplated, the elements of each including means for detecting received signals on a time slot of interest, means for measuring the strength of the received signals, means for storing received signal strength measurements, and processing means for calculating average received signal strengths and for estimating the interference attributable to the received signals. Various elements of the exemplary embodiment described above can perform as one or more of these means. Referring again to FIG. 1, in certain embodiments of the invention, the SSR 111 is the detecting and measuring means, the storage means is any memory accessible to the SSR 111 (including a memory element that is integral to SSR 111, BTS 110, TRX 112, BSC 107, or MSC 102, such as memory 113, memory 107a, or memory 102a), and the processing means is any processor accessible to the SSR 111, including a processor that is integral to SSR 111, BTS 110, TRX 112, BSC 107, or MSC 102. The storage means preferably includes an updatable buffer that has the ability to buffer signal strength measurements, average signal strength calculations, and interference estimations on an iterative or rolling basis.

It will be apparent to those skilled in the art that various changes and modifications of an obvious nature may be made to the present invention, and all such changes and modifications are considered to fall within the scope of the appended claims. For example, although disclosed with respect to idle channel interference estimation, the systems and methods of the present invention are adaptable to various signal processing algorithms that allow measurements during active channel measurement, including algorithms that consider the BER (bit error rate) rather than the signal strength of the interferer as the basis for interpolating the C/I (carrier to interference ratio). As another example, the segments into which each time slot is divided may be of equal length and/or duration, or one time slot may be divided into segments of variable length and/or duration.

Figure 6:
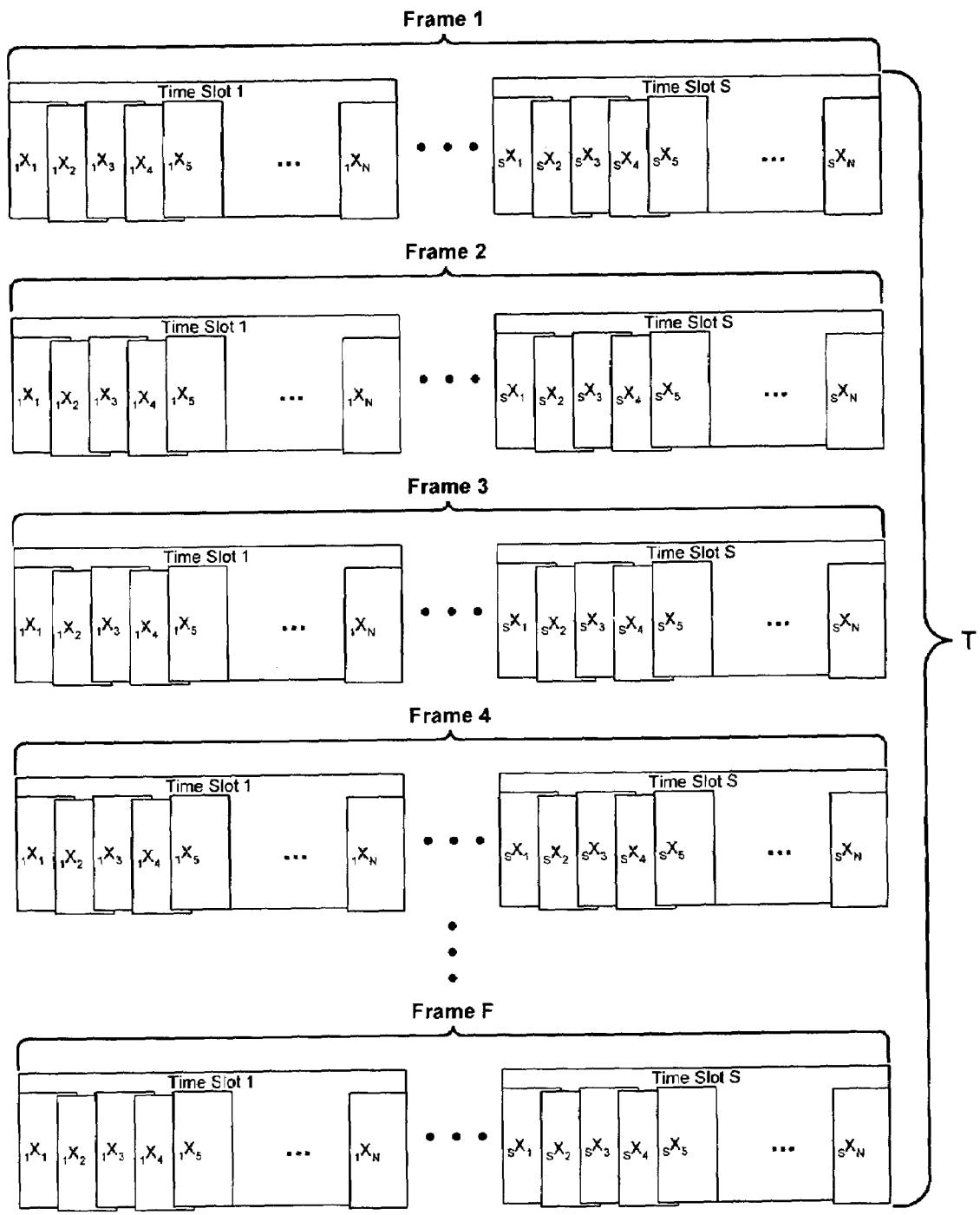
FIG. 6 is a simplified diagram illustrating another exemplary accumulation interval T as related to the systems and methods of the present invention.

Further, as mentioned above the segments into which each time slot is divided may be distinct from one another, having adjacent, and/or abutting sides. FIG. 6 is a simplified diagram illustrating an alternative exemplary accumulation interval T as it relates to the systems and methods of the present invention. In the embodiment shown in FIG. 6, the segments are not distinct. Rather, each segment overlaps one or more preceding and/or successive segments. The staggered vertical alignment of the segments is intended only to enable discernment of the overlapping edges of the segments Those skilled in the art will appreciate that the systems and methods disclosed above can be applied as systems and methods for performing automated traffic channel selection using the above-described methods for interference estimation. More particularly, an optimal available channel can be selected by comparing the estimated signal strength to a predefined threshold value, and establishing a wireless connection on a particular time slot if the estimated signal strength does not exceed the threshold value. Various embodiments of such channel selection methods are contemplated, in which known or yet to be developed traffic channel selection techniques are applied based upon interference estimations performed as described herein.

The systems and methods of the invention can be implemented in the measurement of analog and digital signals. Those skilled in the art will readily appreciate, for example, that a digital locating verification module can be substituted for the SSR.

Other embodiments of this invention will be apparent to those skilled in the art from consideration of the specification and practice of the invention disclosed herein. It is intended that the specification and examples be considered as exemplary only, and within the scope and spirit of the invention as indicated in the description and the following claims.

The invention claimed is:

1. In a wireless network, a method comprising:
    measuring a first received signal strength in individual ones of a plurality of segments within at least one time slot of a first frame in an interval;
    measuring one or more additional received signal strengths in individual ones of a plurality of segments within corresponding time slots of one or more additional frames in the interval, wherein individual ones of the plurality of segments within a particular time slot of the first frame corresponds to respective ones of the plurality of segments of the corresponding time slots of the one or more additional frames;
    calculating an average received signal strength for individual segments of the at least one time slot by averaging individual ones of the measured first received signal strengths of the first frame with the corresponding measured second received signal strengths of the one or more additional frames; and
    estimating at least one interference level based at least in part on the average received signal strengths.

2. The method of claim 1, wherein the segments within the at least one time slot have equal duration.

3. The method of claim 1, wherein the at least one time slot is divided into non-overlapping segments.

4. The method of claim 1, wherein the at least one time slot is divided into overlapping segments.

5. The method of claim 1, wherein the at least one time slot is idle.

6. The method of claim 1, wherein a next interval replaces the oldest frame in the interval with a next subsequent frame and the next interval includes at least one frame of the interval.

7. The method of claim 1, further comprising comparing the estimated interference level of an individual one of the at least one timeslot to a predefined threshold value, and establishing a wireless connection on the individual one of the at least one time slot if the estimated interference level does not exceed the threshold value.

8. The method of claim 1, wherein calculating the average further comprises applying a weighting factor to each of the measured received signal strengths.

9. The method of claim 1, wherein the estimating includes determining, for at least one individual time slot, a maximum of at least a plurality the average received signal strengths corresponding to segments of the individual time slot.

10. The method of claim 1, wherein the estimating includes determining a maximum of at least a plurality of the average received signal strengths corresponding to segments of at least a plurality of the at least one timeslot.

11. The method, as recited in claim 1, wherein the interference level is estimated for a physical channel.

12. The method, as recited in claim 1, wherein the interference level is estimated for a Time Division Multiple Access (TDMA) logical channel.

13. An apparatus for estimating interference on a channel comprising:
    a channel;
    a memory device; and
    a receiving device coupled to the memory;
    wherein the receiving device is configured to:
        measure a first received signal strength in individual ones of a plurality of segments within at least one time slot of a first frame in an interval;
        measure one or more additional received signal strengths in individual ones of a plurality of segments within corresponding time slots of one or more additional frames in the interval, wherein individual ones of the plurality of segments within a particular time slot of the first frame correspond to respective ones of the plurality of segments of the corresponding time slots of the one or more additional frames;
        calculate an average received signal strength for individual segments of the at least one time slot by averaging individual ones of the measured first received signal strengths of the first frame with the corresponding measured second received signal strengths of the one or more additional frames; and
        estimate at least one interference level based at least in part on average received signal strengths.

14. The apparatus, as recited in claim 13, wherein the interference level is estimated for a physical representation of the channel.

15. The apparatus, as recited in claim 13, wherein the interference level is estimated for a Time Division Multiple Access (TDMA) logical representation of the channel.

16. The apparatus, as recited in claim 13, wherein the receiving device and the memory device are included in a base station.

17. The apparatus, as recited in claim 13, further comprising:
    a mobile switching center coupled to the receiving device via the channel.

18. The apparatus, as recited in claim 13, wherein the apparatus is responsive to determine a maximum average received signal strength for at least an individual one of the plurality of timeslots based at least in part on the average received signal strengths corresponding to the plurality of segments corresponding to the at least an individual one of the plurality of timeslots in performing the estimate.

19. The apparatus, as recited in claim 13, wherein the apparatus is responsive to determine a maximum one of the calculated average received signal strengths for the plurality of timeslots based at least in part on the average received signal strengths corresponding to the plurality of segments of the plurality of timeslots in performing the estimate.

20. An apparatus comprising:
    a channel; and
    means for estimating at least one interference level based at least in part on average received signal strengths, wherein the estimating comprises:
        measuring a first received signal strength in individual ones of a plurality of segments within at least one time slot of a first frame in an interval;

measuring one or more additional received signal strengths in individual ones of a plurality of segments within corresponding time slots of one or more additional frames in the interval, wherein individual ones of the plurality of segments within a particular time slot of the first frame correspond to respective ones of the plurality of segments of the corresponding time slots of the one or more additional frames; and calculating an average received signal strength for individual segments of the at least one time slot by averaging individual ones of the measured first received signal strengths of the first frame with the corresponding measured second received signal strengths of the one or more additional frames.

21. The apparatus, as recited in claim 20, wherein the means for estimating determines a maximum average received signal strength for at least an individual one of the plurality of timeslots based at least in part on the average received signal strengths corresponding to the plurality of segments corresponding to the at least an individual one of the plurality of timeslots.

22. The apparatus, as recited in claim 20, wherein the means for estimating determines a maximum one of the calculated average received signal strengths for the plurality of timeslots based at least in part on the average received signal strengths corresponding to the plurality of segments of the plurality of timeslots.

* * * * *